United States Patent

Mizoguchi et al.

[11] Patent Number: 5,239,375
[45] Date of Patent: Aug. 24, 1993

[54] REAL-TIME ENDOSCOPIC IMAGE PROCESSING SYSTEM

[75] Inventors: Tamon Mizoguchi; Makoto Magara; Toshihiko Yamagata; Shinichi Kawamura; Masami Uchibori; Shigekazu Nagashima; Kiyoshi Takeuchi, all of Tokyo, Japan

[73] Assignee: Fukuda Denshi Co., Ltd., Tokyo, Japan

[21] Appl. No.: 831,541

[22] Filed: Feb. 5, 1992

[30] Foreign Application Priority Data

Nov. 1, 1991 [JP] Japan ................ 3-315472

[51] Int. Cl.$^5$ .................. H04N 5/21; A61B 1/04
[52] U.S. Cl. .................. 358/98; 358/168; 358/174
[58] Field of Search .......... 358/98, 901, 225, 168, 358/174

[56] References Cited

U.S. PATENT DOCUMENTS 4,905,668  3/1990  Ohsawa ................ 358/98
4,977,450  12/1990 Yokota ................. 358/98

Primary Examiner—Howard W. Britton
Attorney, Agent, or Firm—Sughrue, Mion, Zinn, Macpeak & Seas

[57] ABSTRACT

A real-time endoscopic image processing system for removing a net pattern from an image has an image processing section (1000) which includes a first controlling circuit (400) for receiving a video signal (S2) from one of a video signal S1 output from a television camera (14) and a VTR, or the like. A horizontal sample-hold circuit (500) generates a horizontal peak sample-hold signal (S5) by continuously sampling and holding the peak value of a sinusoidal video signal voltage from the video signal output (S2) which corresponds to the bright and dark portions of an image. A second controlling circuit (600) delays the horizontal peak sample-hold signal (S5) and compares a delay signal (S5D) with the horizontal peak sample-hold signal (S5) to detect the peak value of the original voltage which varies in a sinusoidal form with respect to the vertical scanning direction, and outputting a vertical peak sampling controlling signal (S6). A vertical sample-hold circuit (700) receives the vertical peak sampling controlling signal (S6) and the delay signal (S5D) and outputs a continuous vertical peak sample-hold signal (S7) according to the vertical peak sampling controlling signal (S6). The vertical peak sample-hold signal (S7) output from the image processing section (1000) is displayed on a monitor.

6 Claims, 11 Drawing Sheets

REAL-TIME ENDOSCOPIC IMAGE PROCESSING SYSTEM

BACKGROUND OF THE INVENTION

1. Field of the Invention

This invention relates to a real-time endoscopic image processing system for processing endoscopic images on a real-time basis, and more particularly to a system for sampling signals corresponding to the brightest point at the central portion of each fiber element of an image fiber which is used for capturing an image of the internal portion of a capillary vessel by means of a television camera, and effecting the interpolation process by use of the sampled signals to create and output a video signal when the picture image is enlarged and displayed on a video monitor for observation.

2. Description of the Related Art

The diseased part of a human body may be observed by inserting an image fiber catheter for capillary endoscopy into the diseased part of a blood vessel. In the prior art for effecting the above observation, the internal portion of the blood vessel is photographed with a small television camera 1400 mounted on an eye piece 1200 of an image guide 1000 of a fiber catheter for capillary endoscopy as shown in FIG. 1. An enlarged image created based on a video signal output from the television camera 1400 is displayed on a monitor 1600 and the enlarged image is observed to diagnose the diseased part.

More specifically, an image T1 of the internal portion of the vessel obtained on the eyepiece end face 1OOOA of the image guide 1000 is enlarged by the eye piece 1200 and an enlarged image T2 of the internal portion of the blood vessel output from the eye piece 1200 is captured by the television camera 1400.

A video signal T3 output from the television camera 1400 is input to the monitor 1600 to display the enlarged image on the image screen thereof.

In the above-described prior art, each of the fiber elements constituting the image guide 1000 has a portion called a core for permitting transmission of light and a portion called a clad for inhibiting transmission of light as is well known in the art.

A net pattern associated with the pixel arrangement on the output plane of the image guide 1000 is formed on the image T1 of the internal portion of the blood vessel created on the eyepiece end face 1OOOA of the image guide 1000 according to the distribution of the portions for permitting transmission of light (that is, core portions of the fiber elements) and the portions for inhibiting transmission of light in the image guide 1000.

In general, the net pattern or the pixel arrangement on the output plane of the image guide 1000 does not correspond to the pixel arrangement of image pickup device of the television camera 1400. Therefore, it is well known in the art that a moire pattern will be caused in the enlarged image displayed on the image screen of the monitor 1600 by the interference between the net pattern and the pixel arrangement of the image pickup device. The moire pattern adversely influences the observation of the enlarged image of the internal portion of the blood vessel displayed on the image screen of the monitor 1600.

In order to suppress the intensity of the moire pattern, in the prior art system, an image on the output plane of the image guide 1000 is captured by the television camera 1400 with the point of focus slightly deviated or a low-pass filter is provided in the eye piece 1200.

However, when the intensity of the moire pattern is suppressed, in the above system, the resolution of the image will be lowered with a decrease in the moire pattern and the contour of the endoscopic image to be observed becomes unclear, making it difficult to correctly diagnose the condition of the diseased part.

SUMMARY OF THE INVENTION

An object of this invention is to provide an endoscopic image processing system capable of displaying a bright and clear endoscopic image with high.. resolution and containing no moire pattern or net pattern. This is accomplished by sampling the peak values of a video signal voltage which is output from a television camera for capturing an image containing the net pattern causing the moire pattern and on which sinusoidal components corresponding to the net pattern are superposed, effecting a two-dimensional interpolation process for the video signal voltage to create and output a video signal wherein the net pattern is reduced or removed.

In this invention, as shown in FIG. 2, the above object can be attained by a real-time endoscopic image processing system which displays a two-dimensionally interpolated image (FIGS. 11B and 12C) by receiving a video signal S2 which is a video signal S1 output from a television camera 14 which has captured an image Sa1 of the internal portion of the blood vessel the image Sa1 is obtained by enlarging an image on the end face 10A of an image guide 10 by use of an eye piece 12 or a video signal SR1 derived by recording/reproducing the video signal S1 by a video tape recorder (VTR), for example, the signal is sampled at timings corresponding to the brightest points at the centers of the respective fiber elements of the image guide 10 (FIG. 9(3)), the peak values of a video signal voltage (FIG. 9(1)) containing the sinusoidal components corresponding to the net pattern which may cause the moire pattern M and which is one of the characteristics of the image guide 10 are held (FIG. 9(4)), and a video signal output subjected to the interpolation process (FIG. 9(5)) in the vertical direction is supplied to a monitor 900.

Therefore, according to this invention, a real-time endoscopic image processing system is provided in which the brightness of each fiber element is substantially equal and which can display an endoscopic image (Figs. 11B and 12C) containing no net pattern by sampling signals corresponding to the brightest portions at the centers of the respective fiber elements constituting the image guide 10 from the video signal S2, which is the video signal output S1 obtained by enlarging the end face image Sa on the end face 10A of the image guide by the eye piece 12 and capturing the enlarged image by the television camera 14, or the video signal SR1 obtained by recording/reproducing the video signal output S1 by the VTR, for example, and subjecting the sampled signals to the interpolation process on a real-time basis to substantially fill the gaps between the fiber elements.

Thus, a bright and clear endoscopic image with high resolution and containing no net pattern can be displayed so that the diseased part inside the capillary vessel can be accurately photographed and displayed for observation and diagnosis of the diseased part.

DETAILED DESCRIPTION OF THE PREFERRED EMBODIMENT

There will now be described an embodiment of this invention with reference to the accompanying drawings.

Figure 1:
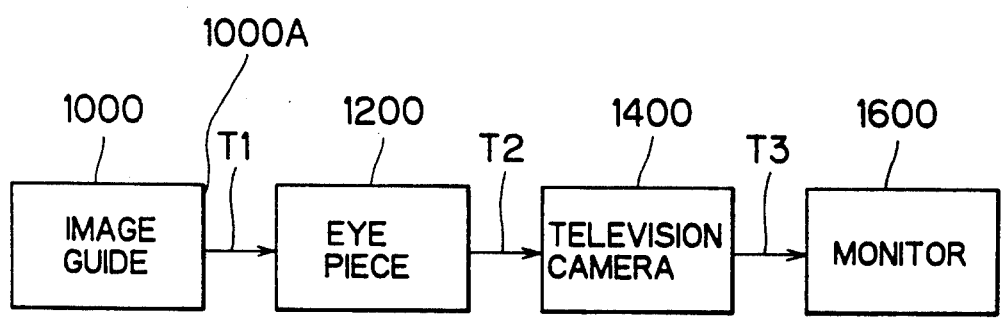
FIG. 1 is a diagram showing the prior art.
Figure 2:
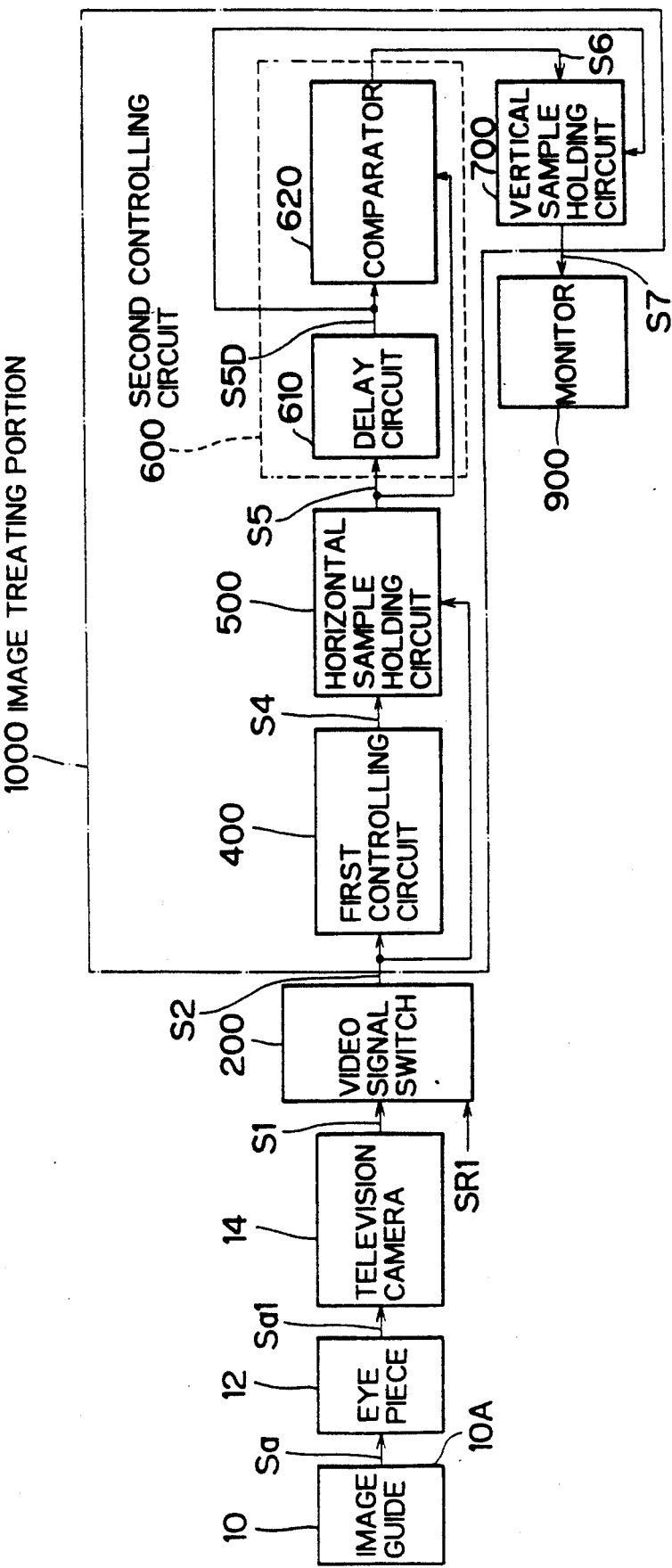
FIG. 2 is a diagram showing a whole system according to one embodiment of this invention.

FIG. 2 is a diagram illustrating one embodiment of an image processing system according to this invention.

The image processing system shown in FIG. 2 includes an image guide 10, an eye piece 12, a television camera 14, a video signal switch 200, an image processing section 1000 and a monitor 900.

The image guide 10 is combined with a light guide to constitute a catheter for blood vessel endoscopy and part of the image guide 10 is inserted into the blood vessel of a patient to create an image Sa of the internal portion of the blood vessel transmitted via the image guide 10 on an eyepiece end face 10A.

The eye piece 12 is a device for enlarging the image Sa of the internal portion of the blood vessel created on the eyepiece end face 10A and projecting the enlarged image Sa1 of the internal portion of the blood vessel on the image pickup device of the television camera 14 the eye piece 12 can be constructed by a condenser lens and other elements.

The television camera 14 has the image pickup device disposed therein and converts the enlarged image Sa1 of the internal portion of the blood vessel into a video signal S1 which is an electrical signal.

The video signal switch 200 is a kind of interface used for embodying this invention and is a selection switch for selectively receiving the video signal S1 output from the television camera 14 or a video signal SR1 recorded/reproduced by a VTR and supplying one of these signals to the next-stage image processing section 1000 which in turn processes the received video signal and displays the result on the monitor 900.

The image processing section 1000 samples and derives out portions of the input signal S2 which correspond to the brightest portions at the centers of the respective fiber elements constituting the image guide 10 and subjects the thus sampled signals to an interpolation process on the real-time basis to substantially fill the gaps between the fiber elements, thereby continuously removing the above net pattern on the real-time basis.

The monitor 900 is a CRT monitor, for example, and displays a color image according to the input video signal.

The image processing section 1000 includes a first controlling circuit 400, a horizontal sample-hold circuit 500, a second controlling circuit 600, and a vertical sample-hold circuit 700.

The first controlling circuit 400 is a circuit for outputting a horizontal peak sampling controlling signal S4 used for sampling and holding the peak value of the video signal S2 in response to the video signal S2 output from the video signal switch 200.

The horizontal sample-hold circuit 500 is a circuit for receiving the horizontal peak sampling controlling signal S4 and the video signal S2 and outputting a horizontal peak sample-hold signal S5 by continuously sampling and holding the peak value of the sinusoidal video signal voltage from the video signal output S2, which corresponds to the bright and dark portions and varies in a sinusoidal form in the vertical and horizontal directions on the plane coordinates of the image Sa of the internal portion of the blood vessel, according to the horizontal peak sampling controlling signal S4.

The second controlling circuit 600 is a circuit for outputting a vertical peak sampling controlling signal S6 and includes a delay circuit 610 and a comparator 620, for example. More specifically, the second controlling circuit 600 continuously records and updates the horizontal peak sample-hold signal S5 for each line or each field to output a delay signal S5D of one line or one field by use of the delay circuit 610, for example, and compares the delay signal S5D of one line or one field with the horizontal peak sample-hold signal S5 by use of the comparator 620, for example, to detect the peak value of the signal voltage which varies in a sinusoidal form with respect to the vertical scanning direction and output a vertical peak sampling controlling signal S6.

The vertical sample-hold circuit 700 is a circuit for receiving the vertical peak sampling controlling signal S6 and the delay signal S5D of one line or one field and recording and updating data over one line to read out and output a continuous vertical peak sample-hold signal S7 according to the vertical peak sampling controlling signal S6.

Figure 3:
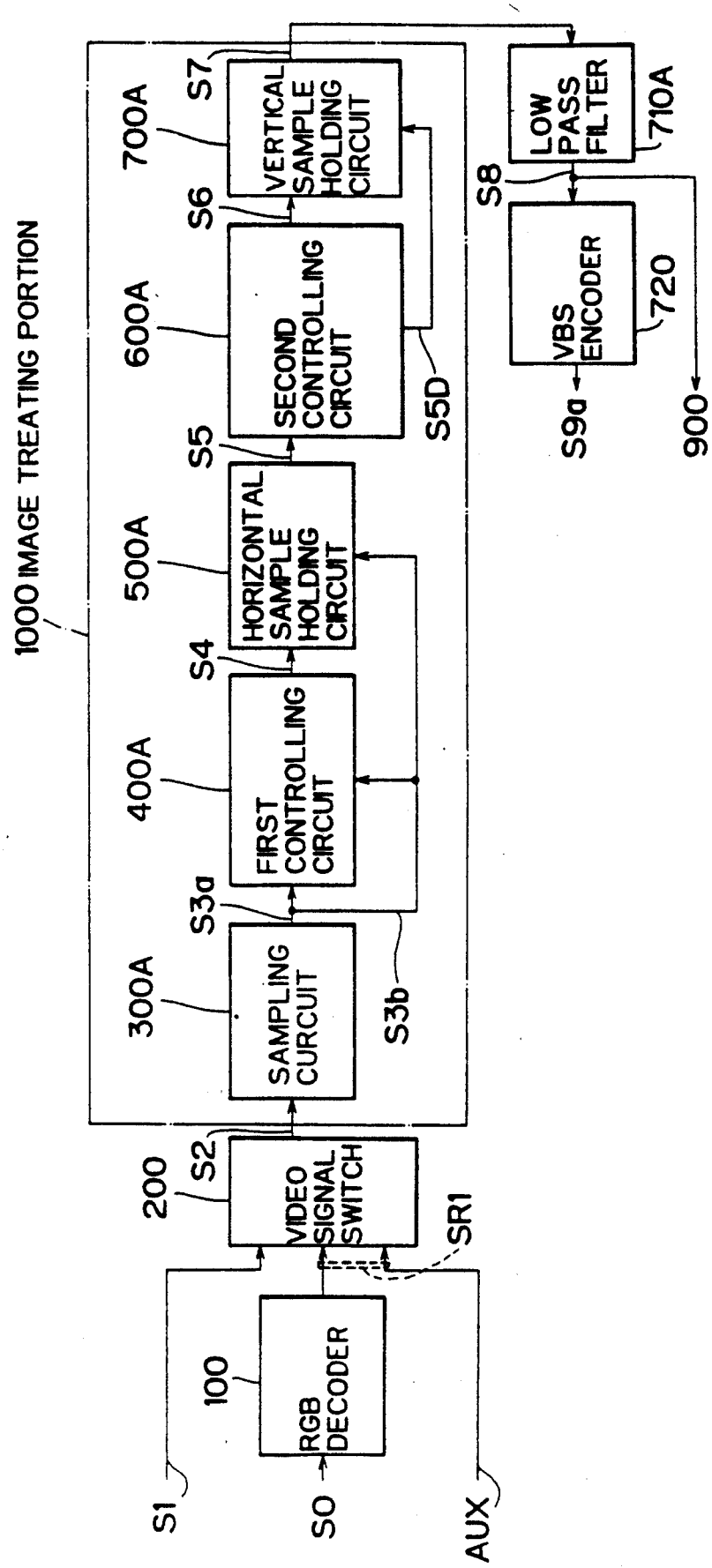
FIG. 3 is a diagram showing an example in which this invention is realized by use of an analog signal processing circuit.

FIG. 3 shows an example of the construction in a case where the image processing section 1000 is an analog signal processing system.

In FIG. 3, a sampling circuit 300A constituting the image processing section 1000 is a circuit for outputting sampling signals S3a and S3b used for correctly extracting the brightest points which correspond to the centers of the respective fiber elements constituting the image guide 10 according to the video signal S2 which is selectively input via the video signal switch 200.

Figure 4:
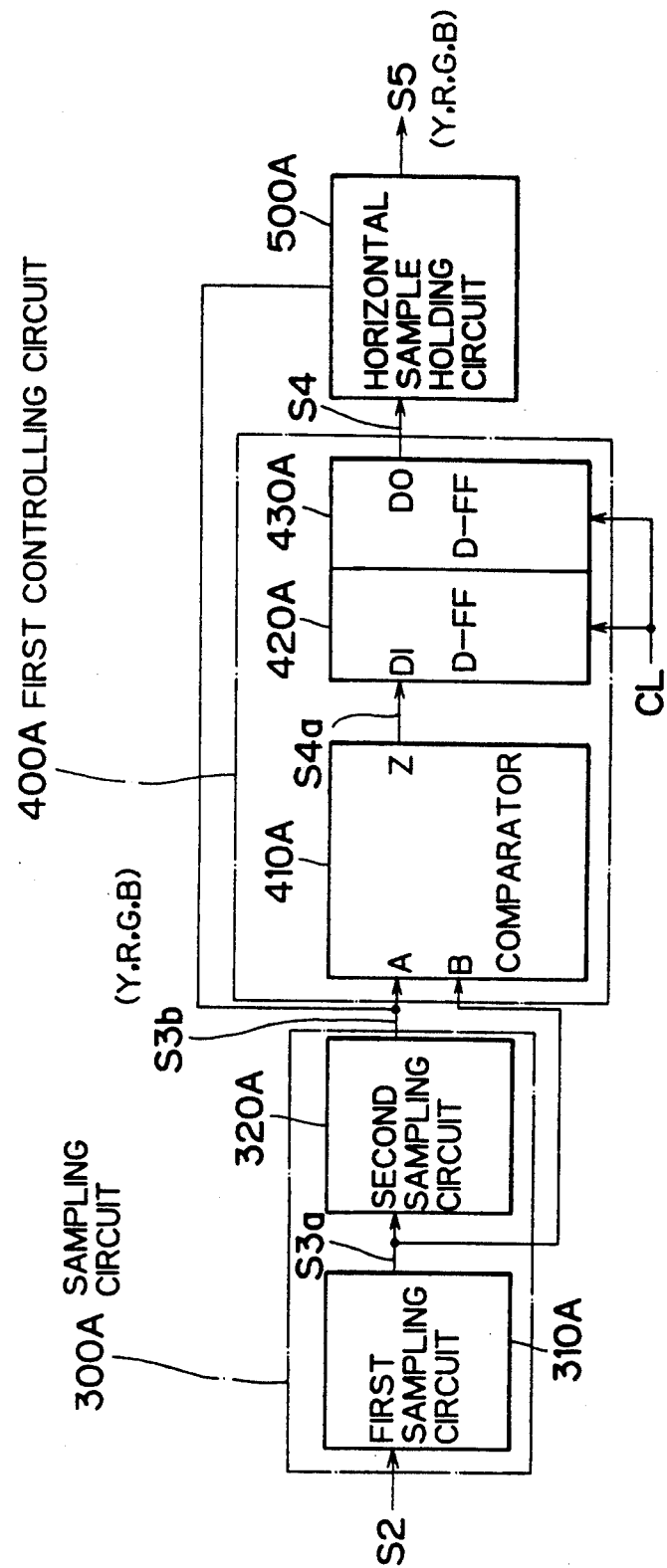
FIG. 4 is a diagram showing another example in which this invention is realized by use of an analog signal processing circuit.

As is clearly shown in FIG. 4, the sampling circuit 300A includes a first sampling circuit 310A and a second sampling circuit 320A.

Figure 9:
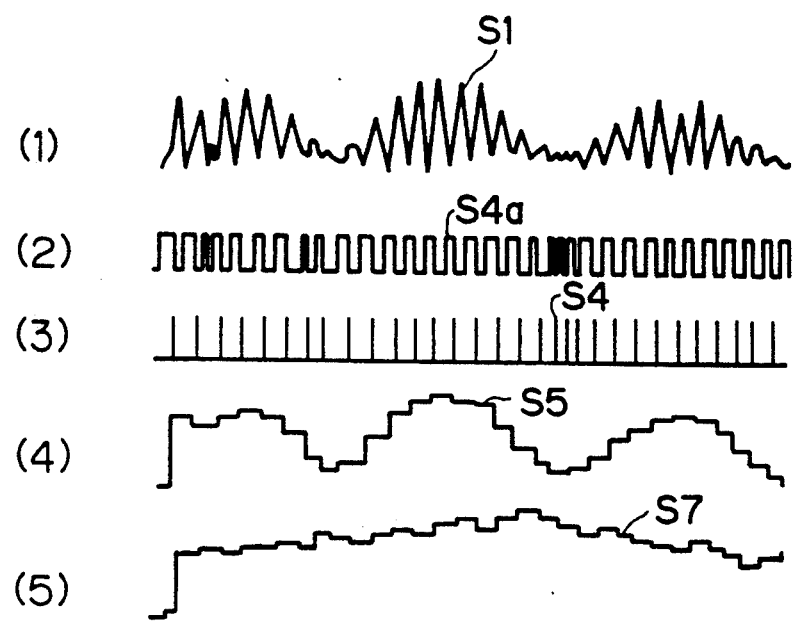
FIG. 9 is a waveform diagram in the circuit of this invention.

In the circuit construction realized by use of the analog signal processing circuit shown in FIG. 3, the first controlling circuit 400 includes a comparator 410A having input terminals A and B for receiving sampling signals S3a and S3b output from the preceding-stage sampling circuit 300A and an output terminal Z for outputting a comparison output signal S4a (FIG. 9(2)), and two D-type flip-flops (D-FFs) 420A and 430A as is clearly shown in FIG. 4.

Further, in FIG. 3, each of an RGB decoder 100, a low-pass filter 710A and a VBS encoder 720 are utilized as interfaces in this embodiment.

The RGB decoder 100 is a device which is connected to a VTR, for example, and separates a desired composite video signal S0 which is an output signal of the VTR into R, G and B video signal components and outputs them when the composite video signal S0 is processed.

The low-pass filter 710A is a filter device for removing noise from the video signal which has been subjected to the interpolation process, that is, the vertical peak sample-hold signal S7.

The VBS encoder 720 is a device for receiving RGB separate video signals from which the net pattern is removed and outputting a composite video signal to be recorded in a VTR to which it is connected, for example.

Figure 8A:
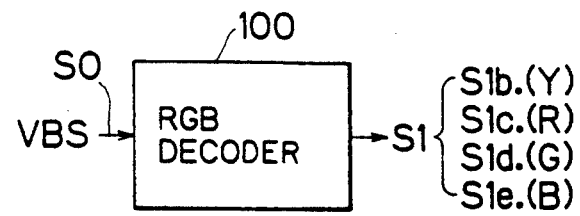
FIGS. 8A to 8D are diagrams respectively showing interface circuits used in this invention.
Figure 8B:
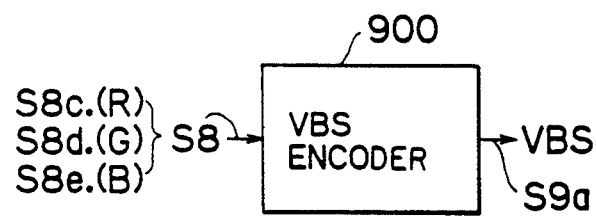
Figure 8C:
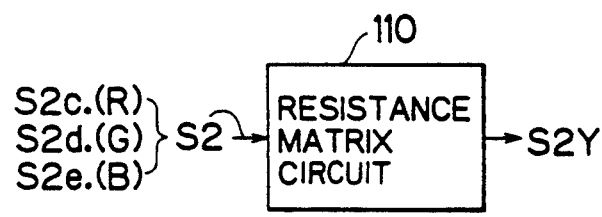

As the other interfaces, a resistance matrix circuit 110 (FIG. 8C) and a logarithm amplifying circuit 120 (FIG. 8D) are used and connected between the video signal switch 200 and the first controlling circuit 400A.

The resistance matrix circuit 110 receives R, G and B signals S2c, S2d and S2e (FIG. 8C) to reproduce a luminance signal S2Y. An output of the resistance matrix circuit 110 is supplied to the first controlling circuit 400A and is used as the horizontal peak sampling controlling signal S4.

The logarithm amplifying circuit 120 receives the luminance signal S2Y (FIG. 8D) and outputs a logarithm compression signal S2y (FIG. 8D) so as to prevent occurrence of the tailing error in the interpolating-/gap-filling process by correctly detecting the peak value of a low level signal (for example, a video signal for an area in which no image guide is photographed).

Figure 5:
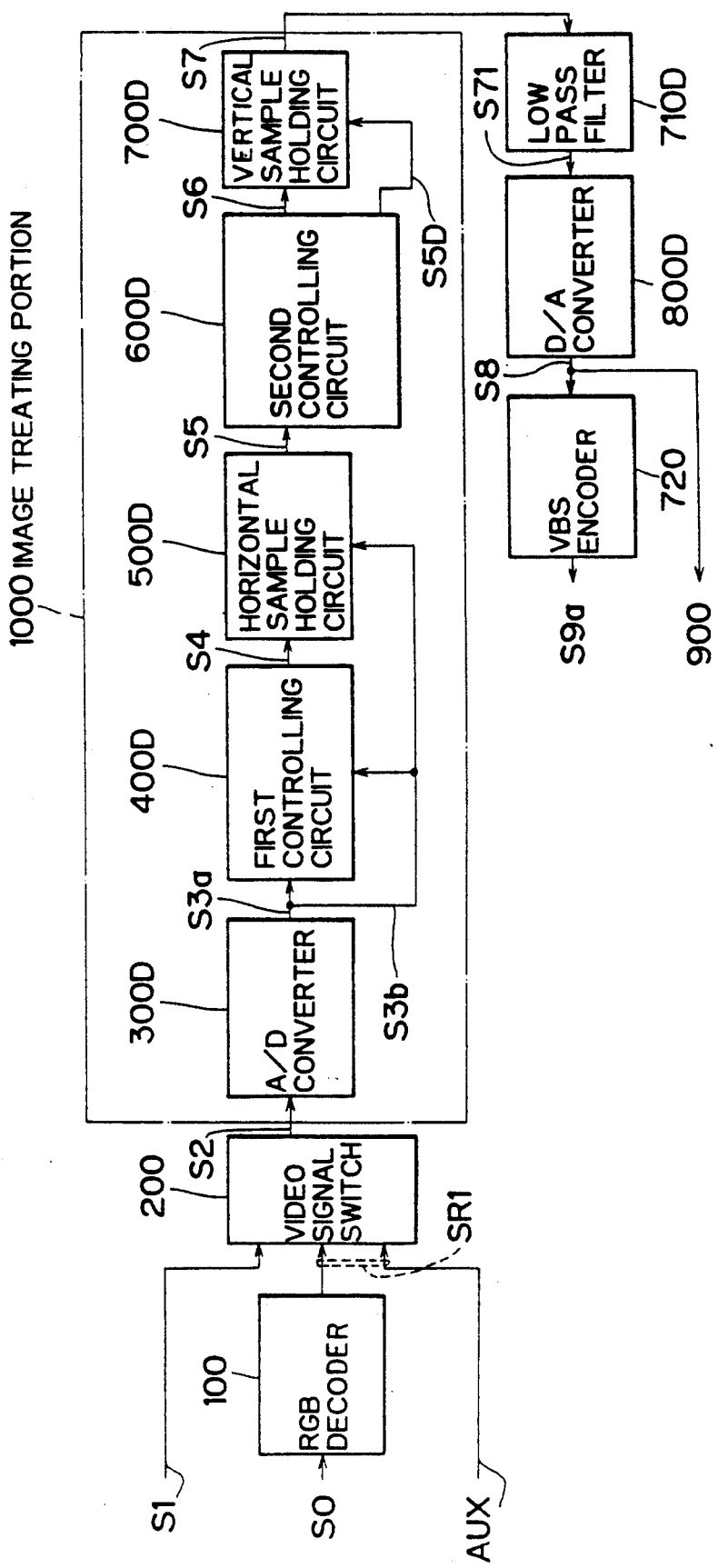
FIG. 5 is a diagram showing an example in which this invention is realized by use of a digital signal processing circuit.
Figure 6:
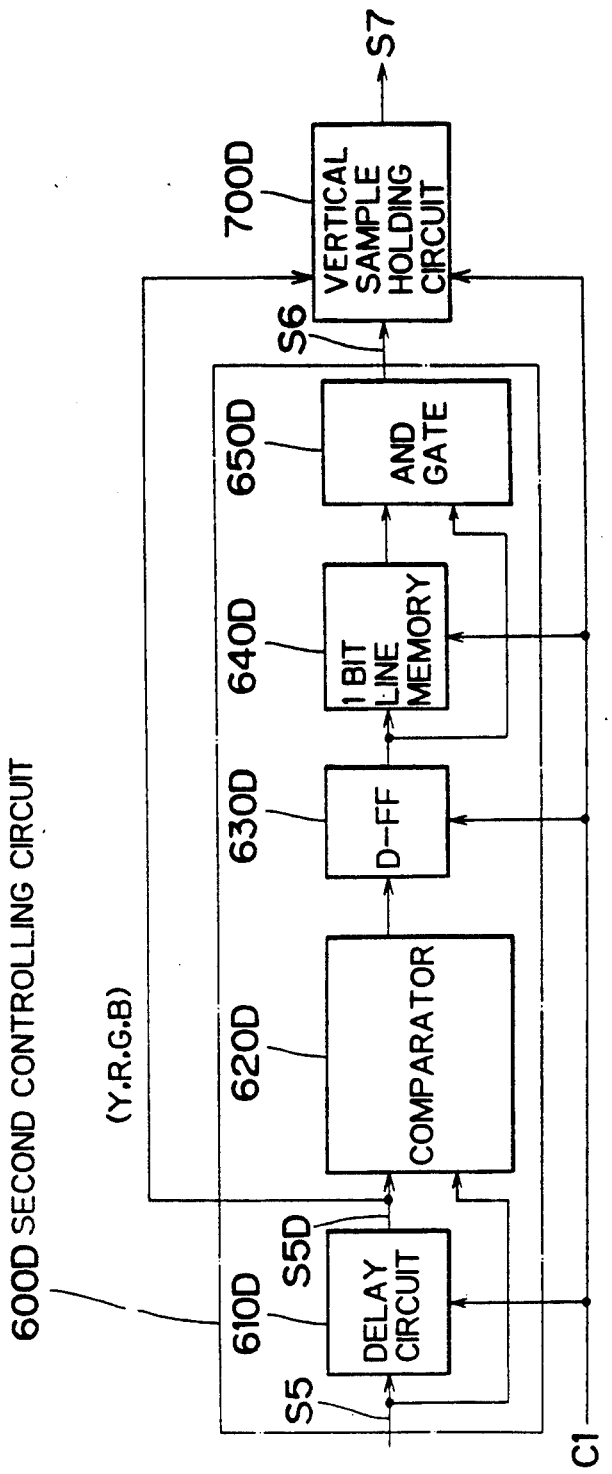
FIG. 6 is a diagram showing another example in which this invention is realized by use of a digital signal processing circuit.
Figure 7:
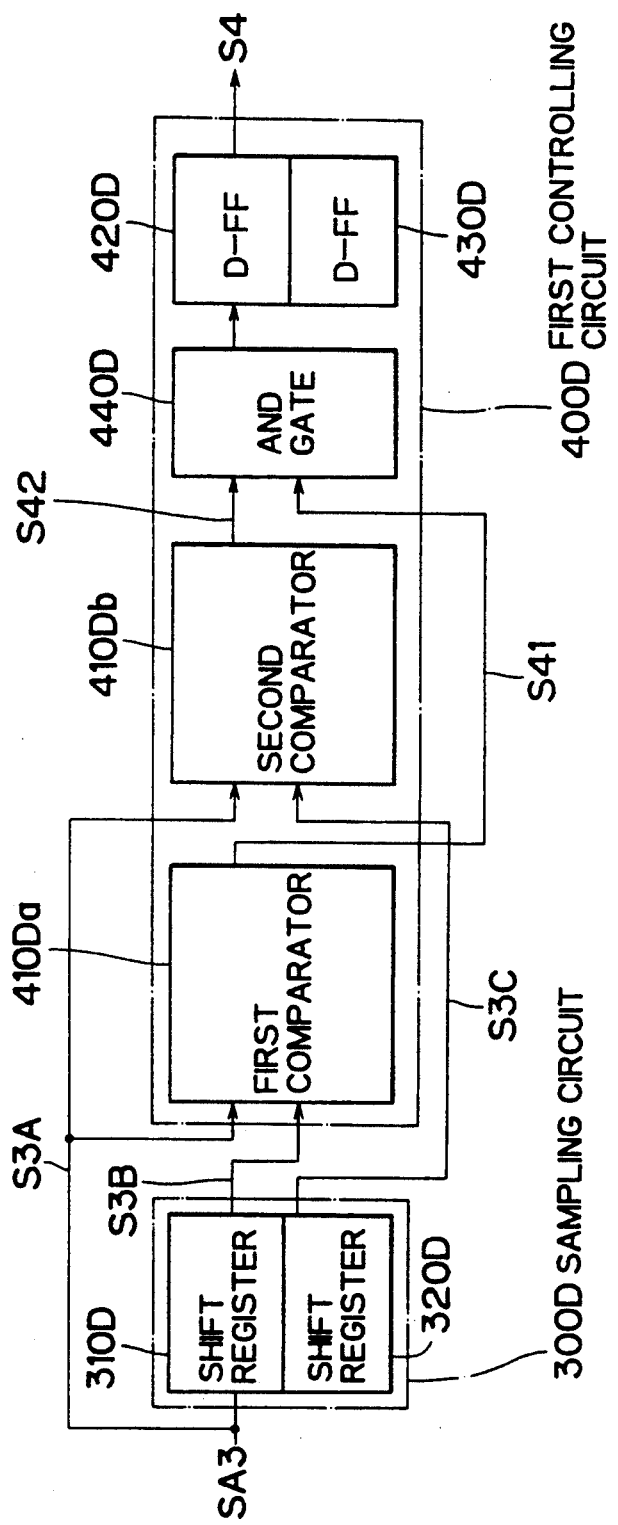
FIG. 7 is a diagram showing still another example in which this invention is realized by use of a digital signal processing circuit.

FIGS. 5 to 7 show an example of the circuit construction made when the image processing section 1000 is a digital signal processing system.

In this example, the image processing section 1000 includes an A/D converter 300D which is used as a sampling circuit, first controlling circuit 400D, horizontal sample-hold circuit 500D, second controlling circuit 600D and vertical sample-hold circuit 700D, and the system further includes an RGB decoder 100, low-pass filter 710D, VBS encoder 720, resistance matrix circuit 110 (FIG. 8C) and logarithm amplifying circuit 120 (FIG. 8D) which are used as interfaces. The functions of the A/D converter 300D, first controlling circuit 400D, horizontal sample-hold circuit 500D, second controlling circuit 600D and vertical sample-hold circuit 700D, RGB decoder 100, low-pass filter 710D, VBS encoder 720, resistance matrix circuit 110 (FIG. 8C) and logarithm amplifying circuit 120 are the same as those of the corresponding circuits of the circuit construction made by use of the analog signal processing system shown in FIG. 3 and the explanation therefor is omitted.

Figure 8D:
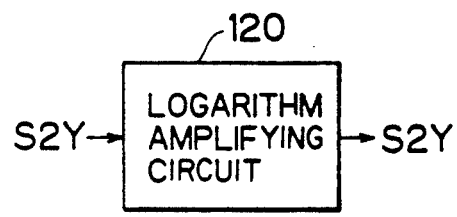

In FIG. 5, the A/D converter 300D is a circuit for converting an analog signal necessary for removing the net pattern by the digital processing into a digital signal, independently receiving R, G and B color signals and the luminance signal S2y (FIG. 8(D)) derived by combining and logarithmically amplifying the color signals and outputting independent digital signals.

Although not shown in the drawing, it should be noted in the following explanation that the input video signal S2, the R, G and B color signals and the luminance signal are supplied via the A/D converter 300D in the case of the digital signal processing according to this invention.

Further, the D/A converter 800D receives R, G and B digital signals which are supplied via the vertical sample-hold circuit 700D and low-pass filter 710D, converts the same into an analog signal S8 and outputs the analog signal S8.

FIG. 6 shows the second controlling circuit 600D of FIG. 5 in detail, and the second controlling circuit 600D includes a delay circuit 610D, comparator 620D, D-FF 630D, 1-bit line memory 640D and AND gate 650D.

FIG. 7 shows the A/D converter 300D and the first controlling circuit 400D of FIG. 5 in detail. The A/D converter 300D includes shift registers 310D and 320D, and the first controlling circuit 400D includes first and second comparators 410Da and 410Db, AND gate 440D, and D-FFs 420D and 430D.

The D-FF 630D, 1-bit line memory 640D and AND gate 650D of FIG. 6, and the AND gate 440D, D-FFs 420D and 430D of FIG. 7 respectively constitute logic filters used for correctly extracting the peak values.

The analog signal processing system of FIG. 3 and the digital signal processing system of FIG. 5 can both make use of the image processing algorithm of this invention to realize the above systems.

Next, the operation of the image processing system of this invention with the above construction is explained.

First, a catheter containing the image guide 10 is inserted into the blood vessel of a patient and light emitted from a light source (not shown) and transmitted via a light guide (not shown) is projected onto the diseased part. Then, an image of the internal portion of the blood vessel is created by the reflected light and transmitted via the image guide 10.

The image Sa (FIGS. 2 and 12A) of the internal portion of the blood vessel created on the eyepiece end face 10A of the image guide 10 is transmitted via the eye piece 12 and the television camera 14 and converted into a video signal S1 as shown in FIG. 9(1).

The waveform of the video signal S1 is a sinusoidal wave as is clearly seen from FIG. 9(1).

However, the sinusoidal wave of the video signal S1 varies according to the rotation angle of the eyepiece end face 10A when the eyepiece end face 10A of the image guide 10 is rotated.

Figure 10:
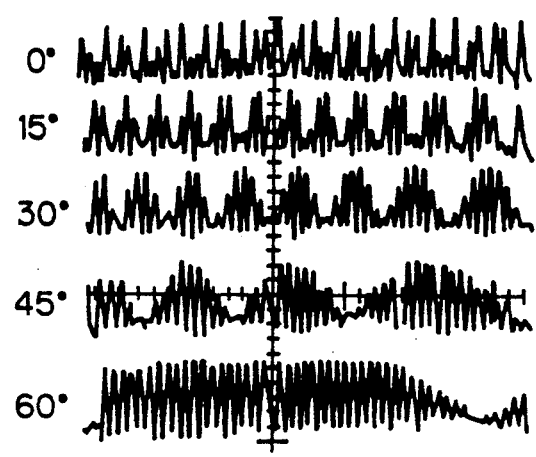
FIG. 10 is a waveform diagram of output signals from a television camera used in this invention.

FIG. 10 shows examples of sinusoidal waves obtained when the eyepiece end face 10A of the image guide 10 is rotated by 10 degrees to 60 degrees and the video signal S1 output from the image pickup device of the television camera 14 is amplified.

The image Sa of the internal portion of the blood vessel obtained on the eyepiece end face 10A of the image guide 10 is explained below by use of a model diagram of FIG. 12A.

Figure 12A:
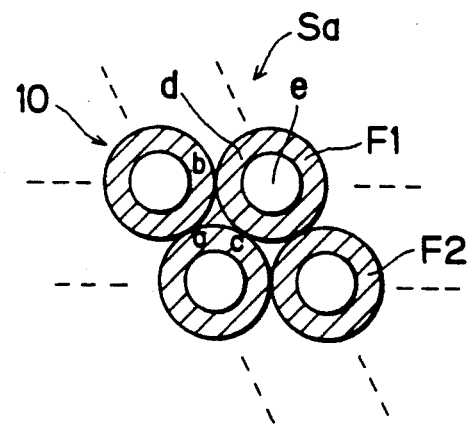
FIGS. 12A to 12C are diagrams showing the relations between the images of the internal portion of a blood vessel and the displayed images.

As shown in FIG. 12A, the image Sa of the internal portion of the blood vessel transmitted via the image guide 10 becomes brightest at the central portions of the fiber elements F1, F2 etc.; . . . constituting the image guide 10 and becomes dark in the peripheral portions of the fiber elements F1, F2 etc.; . . . and triangular areas surrounded by them so that the image of the internal portion of the blood vessel will contain the net pattern created by the dark portions.

Now, the fiber element F1 is explained as an example. The image becomes brightest at the central portion e of the fiber element F1 and becomes dark in the peripheral portion d around the central portion e and in a triangular area created by three contact points a, b and c between three fiber elements including the fiber element F1 as shown with hatching.

This also applies to the other fiber elements F2 etc.; . . .

That is, the net pattern appearing on the eyepiece end face 10A of the image guide 10 is created because only the central portions of the fiber elements are observed brightly and intensely.

Figure 12B:
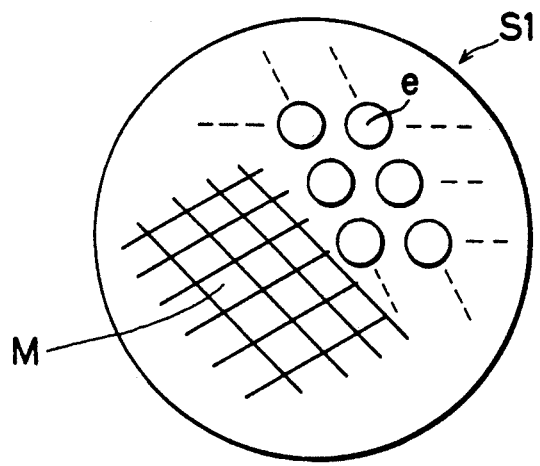

Therefore, in a case where a video signal S1 output from the television camera 14 after capturing the image Sa of the internal portion of the blood vessel which contains the net pattern and which is created on the eyepiece end face 10A of the image guide 10 is directly input to the monitor 900 and displayed thereon, the moire pattern M will be created as interference fringes caused by the net pattern of the image fibers, the scanning lines of the display monitor and the pickup pixel arrangement of the image pickup device of the television camera, and as a result, a monitor display image as shown in FIG. 12B may be created.

In this invention, the peak values of video signal waves corresponding to the central portions e of the brightest portions of the fiber elements constituting the image guide are sampled from the video signal S1 of the television camera.

The following explanation is made by considering a case wherein the image processing section 1000 is analog signal processing circuit (FIGS. 3 and 4) for convenience.

First, the input video signal S2 to be displayed, that is, video signal S2 output from the video signal switch 200 (FIG. 3) is sampled by the sampling circuit 300A.

Then, sampling signals S3a and S3b are input to the first controlling circuit 400 which in turn outputs a horizontal peak sampling controlling signal S4 at a timing which satisfies the condition that the level of the signal S3a is lowered and the level of the signal S3b rises or is kept unchanged (FIG. 9(3)).

Specifically, the first controlling circuit 400A continuously effects the time differential process in response to a luminance signal Y of the video signal S2 so as to detect the maximum point of the luminance signal Y and outputs a horizontal peak sampling controlling signal S4 to the next-stage horizontal sample-hold circuit 500A according to the detected maximum point.

More specifically, when the sampling signal S3b of the second sampling circuit 320A constituting the sampling circuit 300A is input to the terminal A of the comparator 410A constituting the first controlling circuit 400A and the sampling signal S3a of the first sampling circuit 310A constituting the sampling circuit 300A is input to the terminal B of the comparator 410A constituting the first controlling circuit 400A, a comparison output signal S4a is output from the comparator 410A ((FIG. 9(2)) if the condition that A>B or A=B is satisfied. Then, the comparison output signal S4a is input to the D-FFs 420A and 430A and a horizontal peak sampling controlling signal S4 is output from the D-FF 430A.

When the horizontal peak sampling controlling signal S4 and the sampling signal S3b are input to the next-stage horizontal sample-hold circuit 500A (FIG. 3), the horizontal sample-hold circuit 500A outputs a horizontal peak sample-hold signal S5 (FIG. 9(4)) which consists of the peak values of the sampling signal S3b according to the horizontal peak sampling controlling signal S4.

In other words, the horizontal sample-hold circuit 500A is a circuit for continuously outputting the peak value of the R, G and B signals of the video signal S2 with respect to the horizontal scanning direction of the R, G and B signals of the video signal S2 (until the next peak value is output).

The horizontal peak sample-hold signal S5 output from the horizontal sample-hold circuit 500A is input to the delay circuit 610 (FIG. 2) constituting the second controlling circuit 600A and a delay signal S5D, which is delayed by one horizontal scanning period, is output from the delay circuit 610.

The delay signal S5D and the horizontal peak sample-hold signal S5 which is not delayed are input to the comparator 620 (FIG. 2) constituting the second controlling circuit 600A and a vertical peak sampling controlling signal S6 (FIG. 2) is output from the comparator 620 when the condition that the horizontal peak sample-hold signal S5 becomes lower than the delay signal S5D and the delay signal S5D rises or is kept unchanged is satisfied.

That is, the second controlling circuit 600A effects the time differential process by use of the delay circuit 620 which continuously compares an output S5D of the delay circuit 610 obtained by delaying the luminance signal Y of the output S5 of the horizontal sample-hold circuit 500A by one line or one field with the luminance signal Y of the output S5 of the horizontal sample-hold circuit 500A, detects the maximum point of the luminance signal Y in the vertical direction thereof, and outputs a control signal S6 used for updating data of the circulating line memory of the vertical sample-hold circuit 700 and sampling and holding the peak value in the vertical scanning direction according to the detected maximum point.

The vertical peak sampling controlling signal S6 is input together with the delay signal S5D to the vertical sample-hold circuit 700 which in turn effects a predetermined process and then the vertical sample-hold circuit 700 outputs a vertical sample-hold signal S7 (FIGS. 9(5) and 11B) from which the net pattern is removed.

That is, the vertical sample-hold circuit 700 is a circulating video memory which receives the delay signal S5D and rewrites data according to the vertical peak sampling controlling signal S6, and outputs a vertical sample-hold signal S7 which has been subjected to the two-dimensional interpolation process by sampling and holding signal levels corresponding to the central portions of the fiber elements constituting the image guide 10.

More specifically, the vertical sample-hold circuit 700 is a circulating line memory for receiving the R, G and B signals of the delay signal S5D output from the second controlling circuit 600A, storing data of one line and updating the stored data by data obtained by sampling the R, G and B signals of the delay signal S5D according to the vertical peak sampling controlling signal S6 output from the second controlling circuit 600A.

The vertical sample-hold signal S7 subjected to the two-dimensional interpolation process by sampling and holding the central portions of the fiber elements constituting the image guide 10 and is supplied to the monitor 900 via the low-pass filter 710A (FIG. 3) and displayed thereon.

Figure 12C:
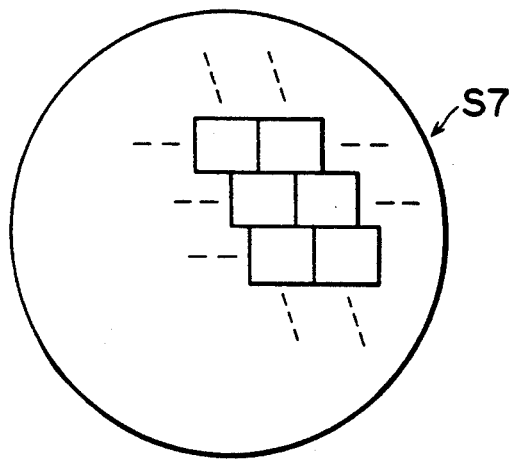

The net pattern is thus removed from an image (FIG. 12C) displayed on the monitor 900 and occurrence of the moire pattern is significantly suppressed.

In the net pattern removing image processing of this invention, the moving image processing can be continuously effected in order to use the image of the internal portion of the blood vessel for observation and diagnosis of the diseased part while the patients heart is beating.

Therefore, as is well known in the art, the output video signal of the television camera 14 is supplied to the monitor 900 and the monitor 900 displays 60 field image planes and 30 frame image planes for each second according to the interlaced scanning system.

For this reason, jitter or flutter of an image will occur between the odd-numbered field image plane and the even-numbered field image plane when a moving image is captured, thus producing an unclear display image.

The system of this invention can be selectively set into a mode in which the image processing is effected for each field image plane so as to properly process a rapidly moving image such as an image of the coronary artery and a mode in which the image processing is effected for each frame image plane so as to properly process a slowly moving image such as an image of the lower-limb artery.

More specifically, the system can be selectively set into the field mode or frame mode by designing the delay circuit 610 of the second controlling circuit 600 of FIG. 2 such that the line delay circuit and the field delay circuit can be selectively set operative.

Figure 11A:
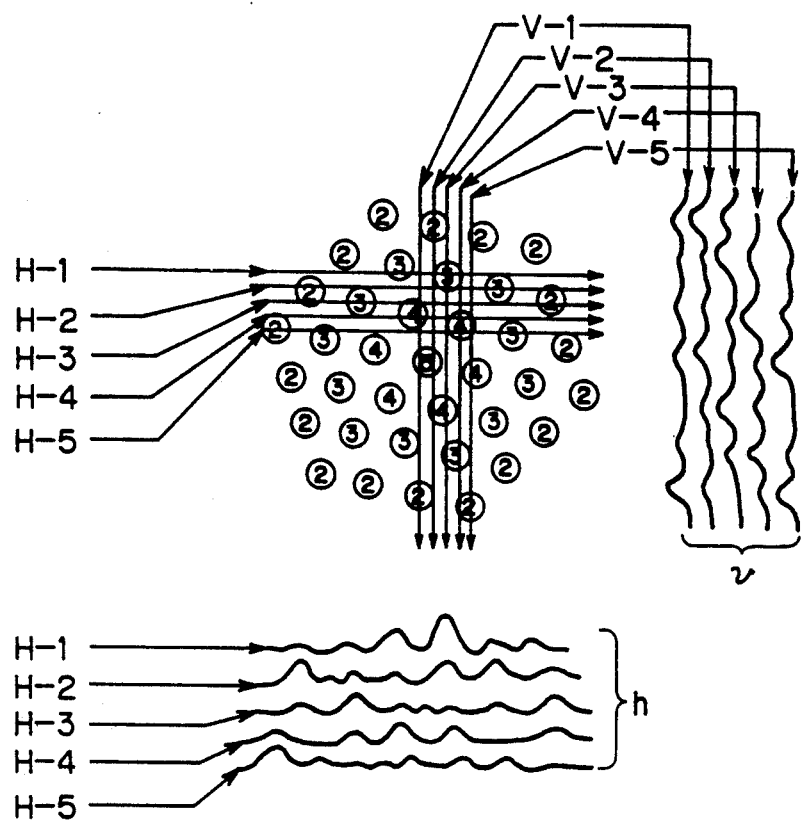
Figs. 11A and 11B are diagrams showing the relations between video signal waveforms and displayed images before and after the processing by this invention is effected.
Figure 11B:
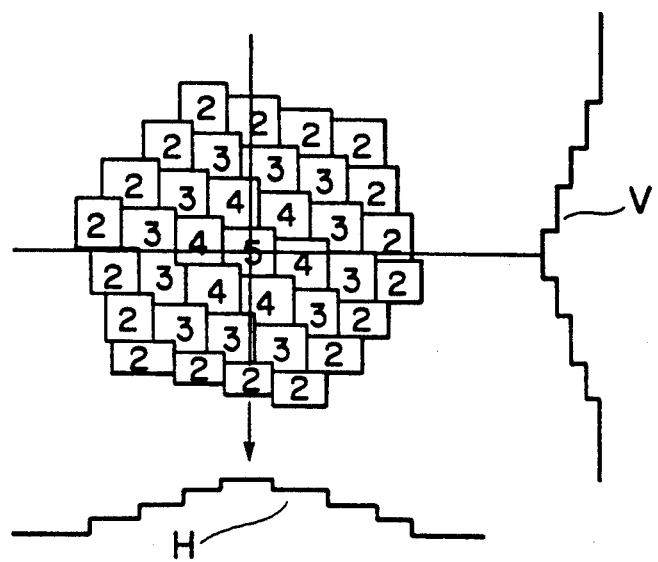

FIGS. 11A and 11B are diagrams showing the relations between the video signal waveforms and the display images and the display image is processed in the field mode.

FIG. 11A shows the waveform of the video signal S2 which is not yet processed and is not yet input to the image processing section 1000 (FIG. 2) and the display image thereof, and FIG. 11B shows the waveform of the video signal S7 which is processed and output from the image processing section 1000 (FIG. 2) and the display image thereof.

In FIGS. 11A and 11B, the numerals described in the diagrams showing the display images indicate the intensity of light.

In FIG. 11A, horizontal scanning lines H-1, H-2, H-3, H-4 and H-5, vertical scanning lines V-1, V-2, V-3, V-4 and V-5, waveform (envelope) h in the vertical scanning direction and waveform (envelope) v in the vertical scanning direction are shown.

In FIG. 11B, waveform (envelope) H in the vertical scanning direction and waveform (envelope) V in the vertical scanning direction are shown.

As described above, according to this invention, the real-time net pattern removing image processing technique can be attained for two-dimensionally sampling and holding the peak value of a video signal according to the video signal S1 of an image of the internal portion of the blood vessel which is obtained by enlarging the image Sa of the internal portion of the blood vessel created on the eyepiece end face 10A of the image guide 10 by use of the eye piece 12 and capturing the enlarged image by use of the image pickup device of the television camera 14.

As a result, it becomes possible to output a video signal which is obtained by sampling the brightest portions at the centers of the respective fibers constituting the image guide in the end face image of the image guide and continuously effecting the interpolation process to fill the gaps between the adjacent fibers.

Thus, the waveform of the video signal S7 which is subjected to the two-dimensional interpolation process is substantially flat, and when the video signal S7 is input to the monitor, an endoscopic image which is bright, clear, free from the net pattern and less influenced by the moire pattern and has the high resolution is displayed on a monitor.

What is claimed is:

1. A real-time endoscopic image processing system comprising:
   an image processing section (1000) which includes:
   a first controlling circuit (400) for receiving a video signal (S2), said video signal being derived by selecting one of a video signal (S1) output from a television camera (14) after capturing an image which is obtained by enlarging an image (Sa) of the internal portion of a blood vessel created on an end face 910A) of an image guide (10) and a video signal (SR1) which is recorded in and reproduced from a VTR or the like, and outputting a horizontal peak sampling controlling signal (S4) used for sampling and holding the peak value of the received video signal (S2);
   a horizontal sample-hold circuit (500) for receiving the horizontal peak sampling controlling signal (S4) and the video signal (S2) and outputting a horizontal peak sample-hold signal (S5) by continuously sampling and holding the peak value of a sinusoidal video signal voltage from the video signal (S2), which corresponds to the bright and dark portions and varies in a sinusoidal form in the vertical and horizontal directions on the plane coordinates of the image (Sa) of the internal portion of the blood vessel according tot he horizontal peak sampling controlling signal (S4);
   a second controlling circuit (600) for continuously recording and updating the horizontal peak sample-hold signal (S5) for each line or each field, comparing a delay signal (S5D) which is displayed by one lone or one field with respect to the horizontal peak sample-hold signal (S5) with the horizontal peak sample-hold signal (S5) to detect the peak value of the signal voltage which varies in a sinusoidal form with respect to the vertical scanning direction, and outputting a vertical peak sampling controlling signal (S6); and
   a vertical sample-hold circuit (700) for receiving the vertical peak sampling controlling signal (S6) and the delay signal (S5D) of one line or one field and recording and updating data over one line to read out and output a continuous vertical peak sample-hold signal (S7) according to the vertical peak sampling controlling signal (S6);
   wherein the vertical peak sample-hold signal (S7) output from said image processing section (1000) is supplied to a monitor (900) and displayed thereon to remove a net pattern from the displayed image plane.

2. A real-time endoscopic image processing system according to claim 1, wherein said image processing section (1000) further includes and RGB decoder (100) for receiving a composite video signal and outputting a luminance signal and R, G and B signals, according to an input composite signal, and a VBS encoder (720) for receiving the R, G and G signals and outputting a composite video signal according to the input R, G and B signals.

3. A real-time endoscopic image processing system according to claim 1, wherein said first controlling circuit (400), said horizontal sample-hold circuit (500), said second controlling circuit (600) and said vertical sample-hold circuit (700) are constructed by analog signal processing circuits.

4. A real-time endoscopic image processing system according to claim 1, wherein said first controlling circuit (400), said horizontal sample-hold circuit (500), said second controlling circuit (600) and said vertical sample-hold circuit (700) are constructed by digital signal processing circuits.

5. A real-time endoscopic image processing system according to claim 1, wherein the video signal input (S2) and the output signal (S7) subjected to the net pattern removing image processing both includes independent R, G and B video signals.

6. A real-time endoscopic image processing system according to claim 1, wherein said second controlling circuit (600) includes a line delay circuit and a field delay circuit which are selectively controlled by use of a selection switch.

* * * * *